Jan. 9, 1934.    L. B. LARSEN    1,942,929

MOTION PICTURE PROJECTOR "B"

Filed Nov. 14, 1922    4 Sheets-Sheet 1

Witness;
Harry H. Hitzeman

Inventor
Lewis B. Larsen

Jan. 9, 1934.    L. B. LARSEN    1,942,929
MOTION PICTURE PROJECTOR "B"
Filed Nov. 14, 1922    4 Sheets-Sheet 3

Witness;
Harry H. Hitzeman

Inventor
Louis B. Larsen
by attorney

Jan. 9, 1934.　　　L. B. LARSEN　　　1,942,929
MOTION PICTURE PROJECTOR "B"
Filed Nov. 14, 1922　　　4 Sheets-Sheet 4
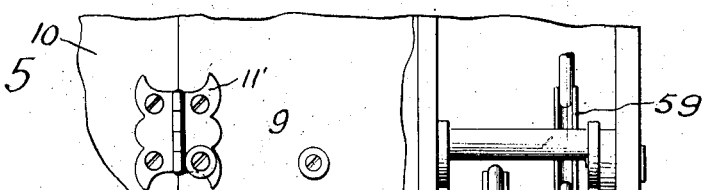
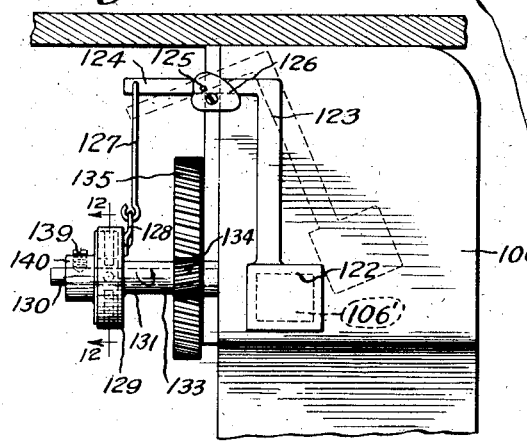
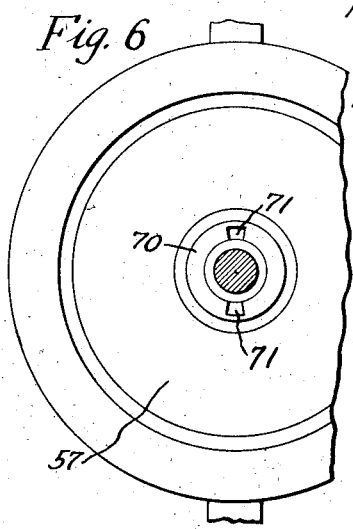
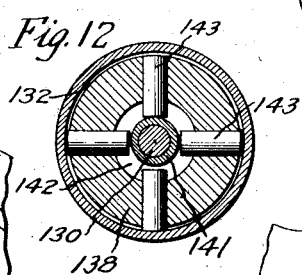
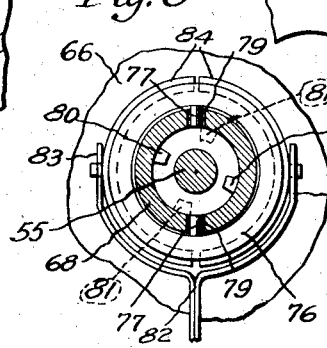

Patented Jan. 9, 1934

1,942,929

UNITED STATES PATENT OFFICE 1,942,929

MOTION PICTURE PROJECTOR "B"

Louis B. Larsen, Chicago, Ill., assignor to Acme Motion Picture Projector Company, Chicago, Ill., a corporation of Illinois Application November 14, 1922
Serial No. 600,968

13 Claims. (Cl. 88—17)

This invention relates broadly to light ray projection, and more particularly pertains to improvements in motion picture projection apparatus.

While this invention is illustrated as embodied in a motion picture projection apparatus, it will be understood that it is not limited to such use, but finds a wide field of utility for other purposes.

The principal objects and advantages which characterize this invention reside broadly in: first, the provision of an apparatus of the character described which is compact, may be manufactured at low cost, and is readily portable; secondly, the provision, in a motion picture projection apparatus, of an improved arrangement of the picture strip feeding, winding and unwinding, and associated mechanisms, together with improved propelling means and a light source and cooling means therefor, together with such other features as will later appear, all embodied in a unit structure; and third, provision of apparatus for the projection of motion pictures which is safe in operation and highly useful for adaptation to general commercial purposes, such as for advertising and other similar demonstrative purposes.

This invention is more particularly characterized by the provision of an improved picture strip winding and unwinding mechanism; the provision of improved means for propelling such winding and unwinding mechanism; the provision of an improved arrangement of winding and unwinding reels for a motion picture strip or film which is characterized by the embodiment therein of speed compensating mechanism; the provision of improved means for driving two reels characterized by the presence of means for compensating for change in speed of a given reel; the provision of improved means for operating two or more simultaneously revoluble elements at relatively constantly changing speeds; the provision of motion picture strip winding and unwinding mechanism, which is characterized by the presence of speed compensation between such winding and unwinding elements; the provision of a pair of revoluble feeding and winding elements for a flexible strip, in combination with means for driving the elements, and characterized by the provision of a slip drive connection between such elements for permitting simultaneous operation of the elements at relatively constantly changing speeds.

This invention is still further characterized by the provision of improved power transmission means embodying two revoluble elements connected by a flexible motion transmitting element, which embodiment is characterized by the maintenance of substantially constant tension in the motion transmitting element; the provision of power transmission means embodying a driving and a driven element relatively lineally displaceable and connected by a flexible motion transmitting element, which is characterized by the provision of means for maintaining the tension of said motion transmitting element constant; the provision of a power transmitting means embodying two pulleys adapted for relatively axial displacement connected by a belt and characterized by the provision of means for maintaining the tension of said belt substantially constant when said pulleys are relatively displaced; and the provision of power transmission means embodying two pulleys connected by a belt, said pulleys having their axes relatively displaceable and characterized by the provision of means for maintaining a tension of said belt constant when said pulleys are relatively displaced.

As further characterizing this invention there is embodied in a unit structure means for feeding and winding a flexible strip characterized by the provision of a motor and manual driving means; the provision of power transmission means for feeding and winding a flexible strip which is characterized by the provision of a motor and manually operated means for driving said feeding and winding means, wherein manual or motor operation of the feeding and winding means is permissible without positive disconnection of either; and the provision of motion picture strip feeding and winding mechanism characterized by the embodiment therein of manually operated means for driving same, in combination with a motor, and a non-positive connection between said motor and manual means for permitting operation by either the motor or manual means without complete disconnection of either from said mechanism.

The foregoing and such other objects and advantages as may appear or be pointed out as this description proceeds are attained in the structural embodiment illustrated in the accompanying drawings, in which:

Figure 2a is a detail view of a manual operating means;

Figure 5 is a fragmentary and elevational view of the device;

Figure 4:
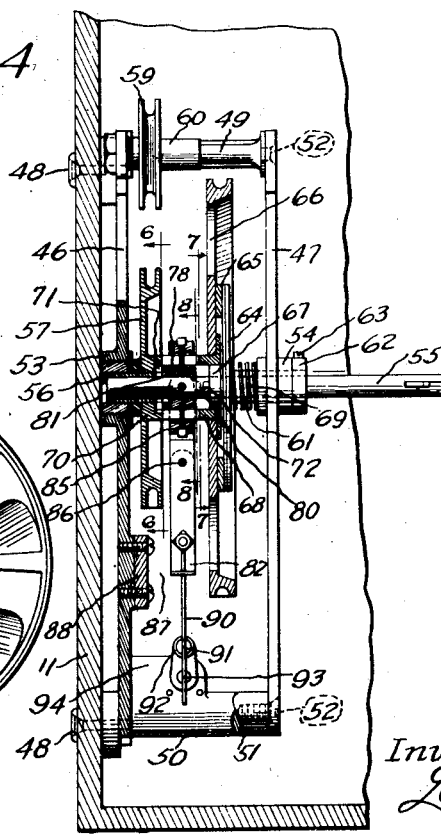
Figure 4 is a fragmentary vertical sectional view taken on the line 4—4 of Figure 2, looking in the direction indicated by the arrows.
Figure 9:
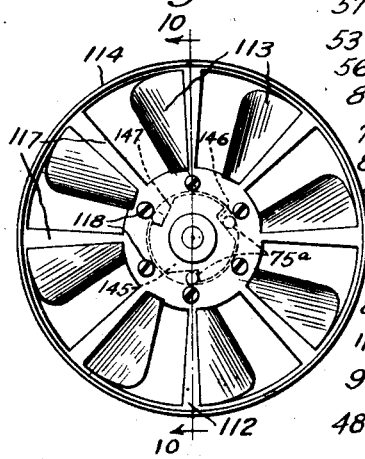
Figure 10:
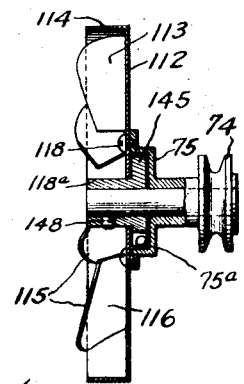

Figures 6, 7, and 8 are detail sectional enlarged views of parts of the device taken on lines 6—6, 7—7, and 8—8, respectively, of Figure 4, looking in the directions indicated by the arrows;

Figures 9 and 10 are elevational and transverse sectional views, respectively, of an improved fan construction;

Figure 11 is an enlarged section of a detail; and

Figure 12 is a transverse sectional view of a detail.

Referring more particularly to the drawings, there is provided a casing 5, in which is contained, for the most part, the projection apparatus embodied in this invention, with the exception of the control levers and various adjusting devices as will be hereinafter explained. The casing comprises bottom and top walls 6 and 7, respectively, end walls 8 and 9, and front and rear walls 10 and 11, respectively. The front wall 10 is hingedly mounted at 11 on the end wall 9, and latching devices 12—12 are provided for retaining said wall 10 in enclosed position. In this manner the contents of the casing may be readily rendered accessible by swinging open the front wall 10 on its hinges.

Figure 1:
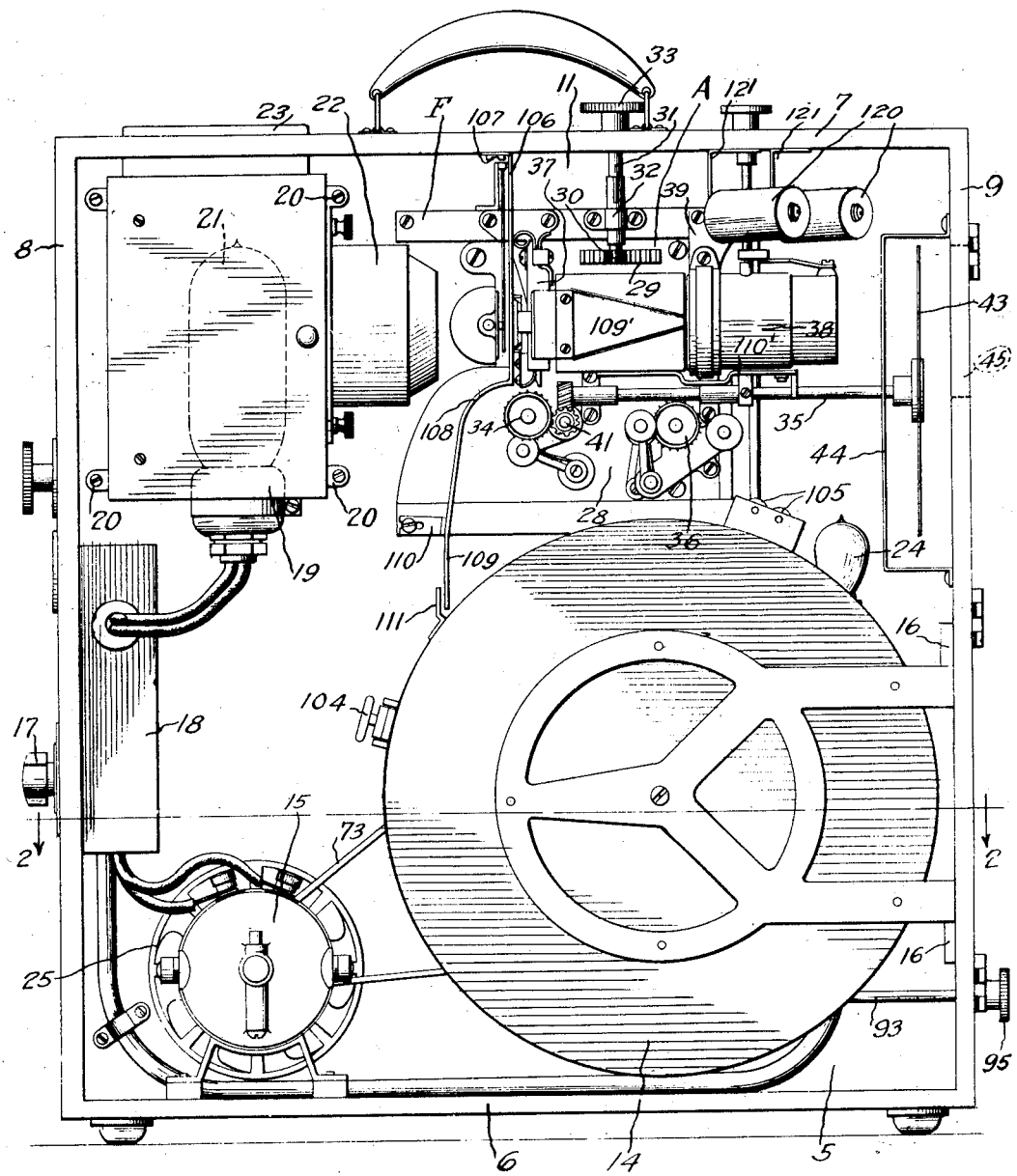
Figure 1 is a side elevational view of motion picture projection apparatus involving the improvements of this invention.
Figure 2:
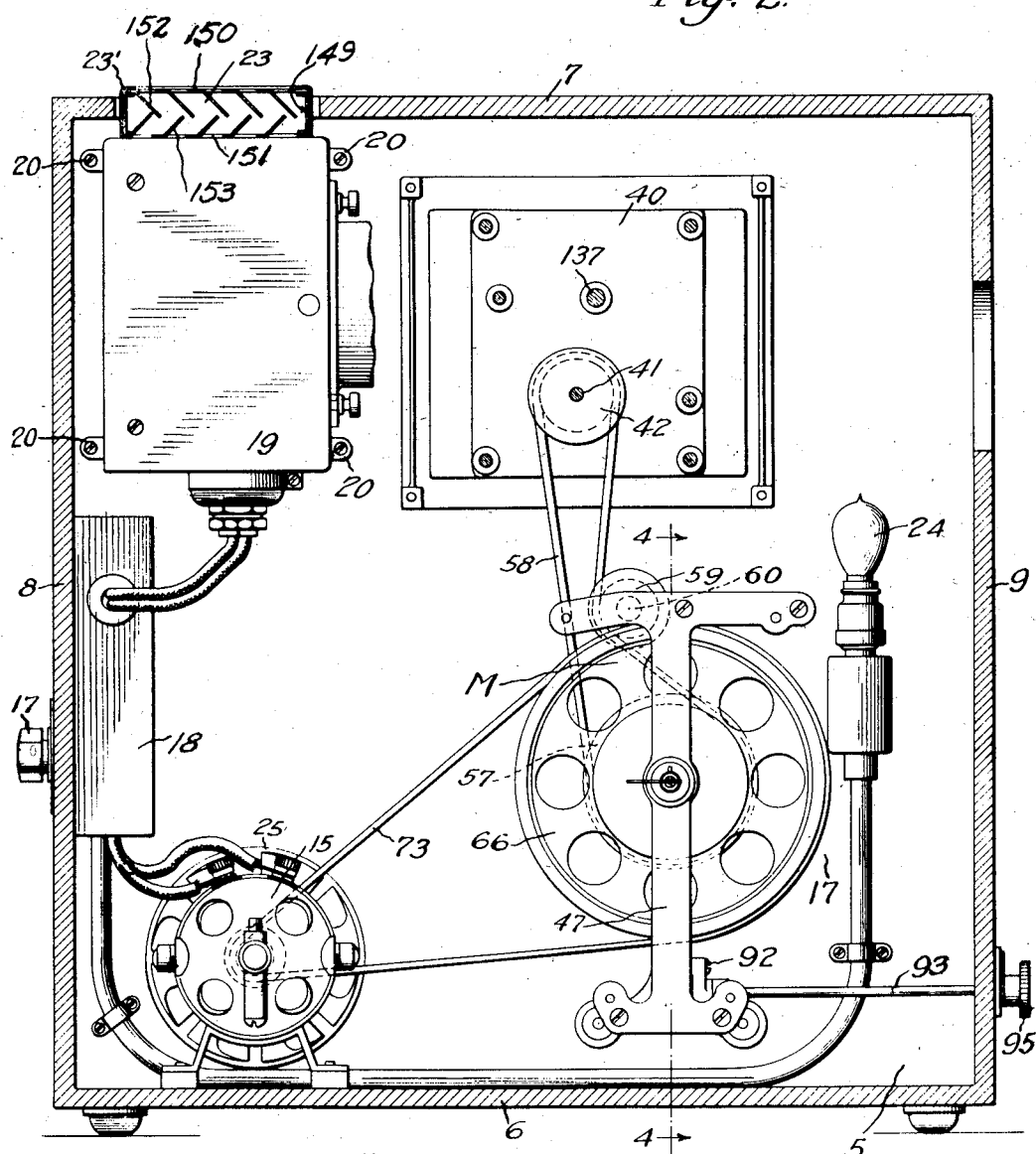
Figure 2 is a similar view, portions of the apparatus being removed.
Figure 3:
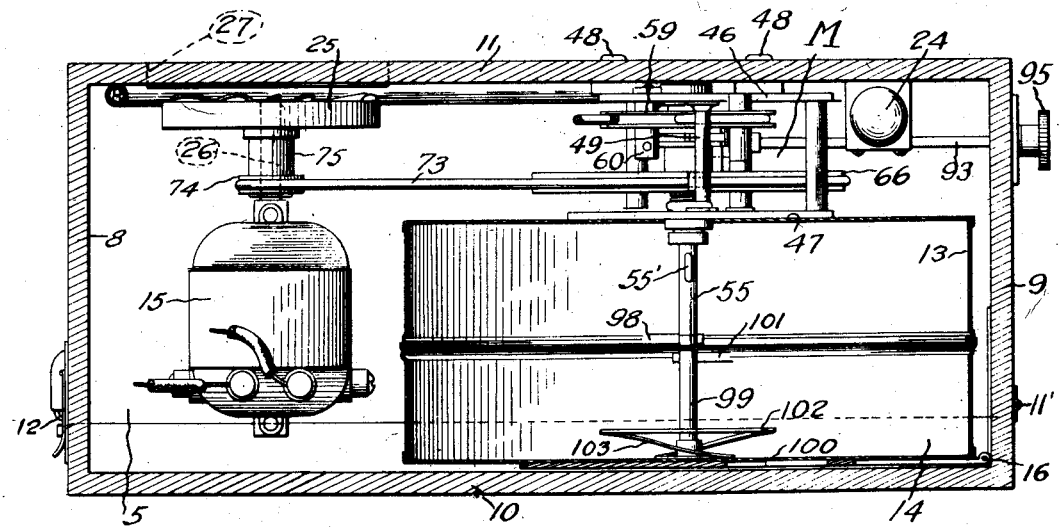
Figure 3 is longitudinal horizontal sectional view taken on the plane of the line 2—2 of Figure 1, looking in the direction indicated by the arrows.

As will be observed upon viewing Figures 1, 2, and 3, the casing 5 contains adjustably mounted intermittent picture strip feeding mechanism generally designated A, said mechanism being mounted in a frame F; reel containers 13 and 14, motion transmitting mechanism generally designated M; and a propelling means such as an electric motor 15. The intermittent feed mechanism A is mounted in the frame F on the side wall 11, and the motion transmitting mechanism M is also mounted on said side wall, said motion transmitting mechanism serving to support one of a pair of reel containers, and the other of said reel containers being hingedly mounted at 16, in order that the same may be swung out of the casing as desired. The motor 15 is mounted on the bottom wall 6 and is controlled by a switch 17, which switch further controls the resistance units (not shown) which are arranged in a box 18 supported on the end wall 8 for running the motor at various speeds. A lamp-house 19 is suspended from the rear wall 11 on brackets 20—20, said housing containing an incandescent lamp 21, or other suitable source of light, and having a light ray projecting element 22 arranged on one wall thereof, and directed towards the longitudinal axis of the intermittent feed mechanism A.

In order to afford an escape for gases and heat from the lamp house 19, there is provided a ventilating device 23 in the upper open portion thereof. This device preferably comprises a frame portion 23' in which a continuous channel member 149 is placed. Above and below the channel member, within the frame 23' there are provided the plates 150 and 151, said plates being provided with baffles 152 and 153, which latter are struck from their respective plates and are bent toward each other at such an angularity that the respective ends of such baffles overlap, and thus prevent escape of light rays or flame but permit escape of heat and gases.

In order to illuminate the interior of the casing back of the reel container so that the operator may observe the operation, I provide a lamp 24. The light of the lamp 24 is arranged not to interfere with the projection of pictures, by the employment of a suitable switch.

For ventilating the casing 5, I provide a fan 25, mounted on the shaft 26 of the motor 15, and disposed axially with respect to an opening 27 in the wall 11 of said casing, said fan operating, as will be more specifically pointed out later, to propel air into the casing. The detail construction of the fan forms an important part of this invention and will be further referred to presently.

As shown in Figure 1, the intermittent feed mechanism for the picture strip comprises the frame F, which is fixedly secured to the rear wall 11, near the top thereof, said frame having the intermittent feed mechanism longitudinally slidably arranged thereon. This mechanism is substantially identical with the intermittent feed mechanism described and claimed in my co-pending application Serial No. 600,967, and therefore, except in so far as the details of this mechanism are related to the present invention, such details will not be described here. This picture strip feeding mechanism comprises generally a carriage 28, provided, near its top portion, with a rack 29, a pinion 30, carried by a vertically disposed shaft 31, being in meshing engagement with the rack 29. The shaft 31 is mounted in a suitable bearing 32 carried by the frame F, and projects beyond the top wall 7 to receive a knurled wheel 33.

The carriage 28 has operatively mounted thereon the intermittently operated picture strip feeding drum 34, shutter shaft 35, and picture strip take-up drums 36, through which latter the picture strip is threaded.

Near one end of the frame F, that is, the end of said frame near the lamp-house, there is provided a picture framing device 37, through which the picture strip passes, said framing device having an opening therein which is axially alined with the light projecting element 22 and from which opening the picture is projected. At the other end of the frame F there is mounted the adjustable projecting lens or objective 38, a bracket 39 serving to secure said objective to the frame F, so that the objective is in axial alinement both with the framing aperture 37 and the light ray projection element 22.

As described in detail in the co-pending application referred to, the carriage 28 includes the outer wall or portion which appears in Figure 1, and also includes a rear wall or portion 40, which appears in Figure 2. A driving shaft 41 for the intermittent feeding mechanism is mounted in the carriage 28, and on said shaft is fixedly mounted a pulley 42. The pulley 42 is connected to the motion transmitting mechanism M in a manner which will presently appear.

As will be seen upon viewing Figure 1, the shaft 35 has, on the forward end thereof, a shutter 43 which, in accordance with the well known practice, is adapted to revolve across the projected rays of light, a protecting casing or shield 44 being mounted on the front wall 9 for enveloping said shutter. The front wall is provided with an opening 45 through which the pictures are projected.

The motion transmitting mechanism M is characterized by the provision of means, whereby, when projecting pictures, the intermittent strip feeding mechanism will be positively driven by the motor, that is, positively driven as distinguished from a slip or friction drive; and by the provision of means, whereby the reel upon which the picture strip is being wound during projection of pictures will be frictionally driven. The mechanism M is further characterized by the provision of means, whereby, when re-winding, the intermittent feed mechanism is disconnected and the reel positively driven. This arrangement furthermore permits of compensation between the two reels when winding and re-winding.

To the end that the motion transmitting mechanism may possess the features and perform the functions outlined above, said mechanism comprises frame members 46 and 47, the former being fixedly secured upon and in spaced relation to the wall 11 by means of machine screws 48—48. The frames 46 and 47 are fixedly connected in spaced relationship by the provision of integral posts 49, 50 and 51, provided on the frame 46 and abutting the frame 47, machine screws 52—52 extending through the frame 47, and into said posts.

The frames 46 and 47, intermediate their lengths, are complementally provided with axially alined bearings 53 and 54, respectively. A shaft 55 extends through said bearings 53 and 54, said shaft having a sleeve 56 freely rotatably mounted thereon, arranged in the bearing 53, and said sleeve carrying a sheave 57 which is connected, by a flexible belt 58, to the pulley 42. An idling pulley 59 is freely rotatably mounted on a stub-shaft 60, which extends from the frame 46, and one stretch of said belt is trained over said idler pulley. This idler is provided for a purpose which will presently appear.

The shaft 55 is also provided with a second sleeve 61, which is arranged in the bearing 54, and is fixedly secured to the shaft 55 by the provision of a collar 62 and a set screw 63.

A disk 64 is fixedly secured to the sleeve 61, and is provided with a friction lining 65, which engages one face of the large sheave 66. The inner end of the sleeve 61 is enlarged at 67, and the sheave 66 is provided with an axial hub 68, which is adapted to receive said enlargement 67. As shown, the hub 68 is made separate from the sheave, but it will be obvious that said hub and sheave may be integrally constructed. A helical spring 69 is interposed between the bearing 54 and the outer face of the friction disk 64, for maintaining said disk against the face of the sheave 66.

The sheave or pulley 57 is provided with a hub 70 having a plurality of recesses 71 therein, presented towards the sheave 66, and the enlargement 67 affords a clutch element by the provision thereon of a series of projections 72, which are presented in opposed relationship to the pulley 57.

A flexible belt 73 extends over a relatively small driving pulley 74 provided on the hub portion 75 of the fan 25, and said belt is also trained over the large sheave 66 so that said sheave is constantly driven in one direction by said motor. A clutch mechanism, described later, connects the hub and pulley 74 to shaft 55.

A clutch device is provided between the pulleys 57 and 66, on the shaft 55 for the purpose of driving said shaft either positively or frictionally, and for driving said sheave 57 positively. To this end, the clutch device, the details of which are illustrated in Figures 4, and 6 to 8, inclusive, comprises a revoluble ring 76, which encompasses the hub 68 of the sheave 66, said ring being provided with a pair of radial diametrically oppositely disposed pins 77, which extend into a clutch block 78, which latter is mounted on said ring 76 by said pins. The shaft 55 extends through the clutch block and normally this block is not permitted to revolve upon said pins 77, but by the provision of said pins the block settles itself properly when in clutching engagement. The clutch block is caused to rotate with the sheave 66, and normally with shaft 55, by virtue of the hub 68, this hub being provided with longitudinal slots 79 for complementally engaging said pins 77. The clutch block 78 is provided, on one face, with a series of shoulders 80, which are adapted to engage the projection 72, and said clutch block is similarly provided, on its other face, with a plurality of projecting abutments 81, which are adapted to seat in the recesses 71 provided in the hub 70 of the pulley 57.

The clutch block and ring 76 are shiftable longitudinally upon the shaft 55 by the provision of a yoke 82, the arms 83 of which embrace the ring 76 and carry arcuate jaw members 84—84 which encircle the ring and seat in an annular groove 85 provided therein. The yoke 82 is pivoted for lateral displacement on a pin 86, carried by bracket 87, which lies between the sheaves 57 and 66 and is mounted fixedly at 88 on the yoke 46. The yoke 82 has a downwardly extending portion, to which is fixedly secured a flat spring 90, and said spring lies in a diametrical groove 91, provided in a crank pin 92, the latter being fixedly mounted on a shaft 93, which latter is mounted in a bearing 94 provided on the post 50, said shaft 93 extending through the end wall 9 and carrying a knurled wheel 95, by which the shaft may be partially rotated.

It will be observed, upon viewing Figures 4 and 5, that when the wheel 95 is rotated in one direction or the other, the yoke 82 will be rocked on the pin 86 to shift the clutch block 78 into an engagement with either the sheave 57 or the sheave 66. A dial 96 is placed externally of the casing 5 and the wheel 95 carries a finger 97 which is adapted to move over said dial. It will be seen upon reference to Figures 4 and 5, that when the wheel 95 is rotated to the right or clockwise, as viewed in Figure 5, the crank pin 92 will be moved to the left, as viewed in Figure 4, which movement will shift the clutch block 78 into engagement with the clutch element 67, and thus positively drive the shaft 55. Movement of the wheel 95 in the opposite direction will cause the clutch block 78 to engage the sheave 57, by virtue of the pins 81 engaging recesses 71, and as the clutch block is constantly rotated by the sheave 66, through the pins 77 and slots 79, similar rotation will be imparted to the sheave 57. As the shaft 55 is always at least frictionally connected with the sheave 66, it will be seen that when the sheave 57 is being directly positively driven the shaft is frictionally driven, and when the clutch block 78 is moved to positively drive the shaft 55, through the clutch element 67, the sheave 57 will be released. Thus, it will be observed that the picture strip intermittent feed mechanism is positively driven when pictures are being projected, and that the shaft 55, carrying a reel (not shown) onto which the picture strip is being wound, is frictionally driven, so that if for any reason the picture strip becomes jammed so that it cannot freely feed and thereby cannot be wound on the reel, the friction drive will compensate for such an emergency. Furthermore, should the reel attempt to wind the picture strip at a greater speed than desirable and place the picture strip under undue tension the slippage afforded by the friction drive will again compensate. It is, of course, understood that when projecting pictures, the clutch is in positive driving connection with the sheave 57 only.

By the provision of the idling pulley 59 the tension of the belt 58 is, at all times, maintained substantially constant, regardless of the position of the intermittent feed mechanism within certain limits. As explained in my co-pending application the purpose of shifting the intermittent feed mechanism with respect to the framing device 37 is to properly frame the picture, and in order that the tension of the belt 58 will not change as the position of the pulley 42 is varied with respect to the sheave 57, the idler 59 is provided, this idler being stationarily mounted, so that when the pulley 42 is carried to the right, as viewed in Figure 2, the slack which would occur in the belt 58 is taken up by the belt passing over a greater area of the pulley 59, but when the carriage 28 and the pulley 42 are moved to the left in Figure 2, the belt is slackened. Therefore, the tension of the belt 58 is maintained substantially constant at all times.

As hereinbefore pointed out, the film containers 13 and 14 are separable, this being afforded by the construction of said containers as separate halves of a single container. This is best shown in Figure 3, and it will be observed that the container 14, being hinged at 16, can be swung out of the casing 5 when the side wall 10 is opened. The shaft 55 is provided with a key 55' which is adapted to engage in a key-way formed in the hub of the reel to be received on said shaft, and a spring retained pivoted arm 98 retains the reel against longitudinal displacement. The container 14 is provided with a stub shaft 99, secured to the outer wall 100 of said container and projecting inwardly and abutting the end of the shaft 55, as best seen in Figure 3. The stub shaft 99 is provided with a pivoted arm 101, which retains the reel against accidental displacement, and a yieldingly mounted friction ring 102 is carried on flat resilient strips 103 and is adapted to engage one face of the reel so that the latter may not too freely revolve on the shaft 99.

A suitable fastening device 104 serves to detachably connect the reel containers 13 and 14 when in operation. The reel containers are each provided with outlet openings bordered by freely rotatable rollers 105, as is conventional in this type of apparatus, and over which rollers the film strip (not shown) is adapted to be threaded.

As previously generally referred to, the source of light is isolated from the film at all times, with the exception of that portion of the film through which the light rays pass when projecting pictures, and to this end there is provided a partition 106 secured at 107 to the under surface of the top wall 7. The partition 106 extends downwardly just to the rear of the framing device 37, and is, of course, provided with an aperture 106' in alinement with said framing device. The partition is provided with a curved offset portion 108, and terminates in a depending tongue 109, which, for the sake of rigidity, is secured by a bracket 110 to the lower part of the frame F, and is engaged with angularly disposed flange members 111—111, carried by the reel containers 13 and 14. A protective shield 109' is hinged at 110' between the objective and the framing device 37. It will be seen from the foregoing that the exposed portion of the picture strip between the two reel containers is effectively isolated from the source of light, thus reducing the fire risk.

The fan construction, referred to generally hereinbefore, is best shown in Figures 3, 9, and 10, and as there shown comprises the hub portion 75, hereinbefore referred to, and a disk portion 112, of sheet metal, from which disk portion the blades 113 are formed. As best shown in Figure 9, the blades are formed by being punched out and then bent into a generally curved shape as best shown in Figure 10. Of course, the fan may be cast, if desired. An annular flange 114 is provided on the disk 112 for making the fan more rigid. The blade construction, as seen in Figure 10, is such that the edges 115 of the blades are presented toward the direction in which the fan rotates, and thus, the blades have the effect of cutting into the air and driving same along their faces 116 longitudinally or, in other words, parallel to the axis of the fan. The air thus drawn in is deflected into the lamp house 19. The back portions 117 of said blades are, of course, integral parts of the disk from which the fan is constructed, and as these portions 117 are flat, that is, arranged in a plane transversely to the axis of the fan they have no material effect upon the free passage of the air through the fan, and at the same time these portions 117 serve as reinforcing spokes or webs and prevent the blades from unduly vibrating. The central portion of the fan is secured to the hub 75 by screws 118, and thus, if the fan is damaged in operation, it may be readily removed through the opening 27 without disturbing the hub 75.

The fan is supported freely revolubly in one direction on the armature shaft 26 by the provision of a clutch mechanism including the hub 75, central portion 118 of the fan, clutch hub 118a, and balls 75a, the clutch hub having an annular flange 145 which lies in the pocket formed by the fan and its hub. The flange 145 is provided with recesses 146 provided with tangential walls 147 which, when the motor is driving, run the balls up into engagement with the hub 75, but when the fan is driven release the latter from said motor shaft. A set screw 148 secures the clutch hub 118a to said armature shaft 26.

For the purpose of rewinding a film strip after the picture series carried thereby has been projected, there are provided a pair of idler rollers 120 secured upon brackets 121, which are, in turn, secured to the under surface of the top wall 7. The rollers 120 are freely rotatable and are disposed above the anti-friction rollers 105, car ed by the film containers 13 and 14, and said rollers 120 are disposed in planes angularly related to the plane of the rollers 105, so that, when rewinding, the portion of the film disposed outside of the containers may be trained over the rollers 120 and thus take the form of an oblique loop, and prevent kinks in the picture strip. This arrangement is desirable owing to the fact that the reels, while in the same axial plane, are not disposed in the same transverse planes, and thus it is necessary to afford a transfer means for the picture strip.

As a further protection against fire due to exposure of the picture for too long a period to the light rays, I provide an automatic shutter shown best in Figure 11, but which is also shown generally in Figure 1. The aperture 106', through which the picture is projected, is normally, that is, when the machine is not running, closed by a shutter 122, said shutter being adapted to lie across the opening 106'. The shutter 122 is carried by a bell-crank shaped arm 123, the upper portion 124 of which is pivoted at 125 on a bracket 126 supported by the frame F. The shutter is disposed upon the rear face of partition 106. The arm 124 is connected by link 127 to the end of a rocking arm 128, which latter is fixedly secured to a disk 129. The disk 129 is freely mounted for partial rotation on a transverse shaft 130 carried by the wall 28 of the carriage. The disk 129 is provided with a hub 131 which is in abutting engagement with a collar 133, said collar being formed integrally with a pinion 134, which latter is rotatable upon the shaft 130 and driven by a gear 135, the latter being in operative engagement with the intermittent feed mechanism, but adapted to rotate continuously when such mechanism is in operation. The disk 129 is provided with a chamber having a peripheral surface 132, and within the chamber thus provided there is disposed a drum 138, secured to the shaft 130 by the provision of a set-screw 139 which passes through the hub 140 of said drum. The drum 138 is provided with a sleeve 141 which is axially disposed within and integral with the drum, the latter having an annular chamber 142 surrounding said sleeve. A plurality of radially arranged freely slidable pins 143—143 are carried by the drum 138 and these pins normally, that is, when the drum is at rest, abut the sleeve 141. It will thus be observed that as the gear 135 rotates the pinion 134 and shaft 130 are rotated at a high rate of speed, and the friction set up between the pins 143 and the disk 129 causes the latter to be displaced circumferentially and thus exert a downward pull on the link 127 and move the shutter to the dotted line position. This maintains as long as the intermittent feed mechanism continues to properly operate. Should the mechanism which feeds the picture strip stop due to an accident to such mechanism, the shutter 122, being of sufficient weight, will immediately drop by gravity across the opening 106', and thus shut off the light from the portion of the picture exposed in alinement with said opening. It will of course be understood that the friction between the hub 131 and collar 133 is not sufficient to prevent the return of the shutter to a closed position as explained.

As generally referred to hereinbefore, the apparatus so far described is adapted to be operated either by the motor 15, or by the provision of manual means such as a crank 37a Figure 2a, this crank being attached to the shaft 137, seen in Figure 2.

In the operation of this motion picture projection apparatus, the lamp is lighted in the usual manner, and the picture strip is threaded from a reel which is placed on the stub shaft 99. The picture strip is withdrawn between the rollers 105, provided on the container 14, under the drum 36, and down through the framing device 37, the picture strip passing from said framing device about the drum 34, thence to the take-up drums (not shown) which operate with the drums 36. From the take-up drums the picture strip is extended to a second reel which is mounted on the shaft 55 within the container 13. The reel (not shown), which is arranged in the container 13, is keyed to the shaft 55 by means of the key 55', and as now arranged the machine is ready for operation. The motor is now started and revolves in a clock-wise direction, as viewed in Figures 1 and 2, and thus imparts a rotation to the large sheave 66, which, in turn, imparts rotation to the shaft 55 through the friction disk 64. The clutch block 78 is, at this time, in driving engagement with the pulley 57, and thus the intermittent feed mechanism is positively driven. As long as the apparatus operates properly, the shutter 135 will remain out of the way as hereinbefore explained.

If it is desired to operate the machine manually, or if the motor should fail, the clutch block 78 is kept in engagement with the pulley 57. The crank 137a is then attached to the shaft 137 and motion imparted thereto in the proper direction. This motion is transmitted to the pulley 57, and as the clutch block is now in engagement with pulley 57, motion is transmitted to the shaft 55. However, as the belt 73 is connected to the small sheave 74, this will impart rotation to the fan, the ball clutches 75a releasing the shaft 15', and thus, while the fan is driven in the proper direction, the motor is not moved. Thus, the machine may be manually operated with all the features functioning the same as when motor driven.

On re-winding, the clutch block 78 is moved to positively engage the clutch element 67, and thus impart positive motion to the shaft 55. When rewinding, the reel which was attached to the shaft 55 during the projection of a picture is transferred to the shaft 99 and the empty reel is secured to the shaft 55. As previously explained, the portion of the picture strip outside of the containers is looped over the rollers 120 and secured to the empty reel. The motor is now started, and as the clutch block 78 has positive connection with the shaft 55, the picture strip will be re-wound for future use snugly upon the empty reel. The intermittent motion transmitting mechanism is not, at this time, moved, because the clutch block 78 has released the pulley 57'.

It will be observed that both when operating during the projection of a picture and during rewinding of the picture strip, the two reels are permitted a wide range of relative speed in order to compensate for the difference in the diameter of the reel at starting to wind and at finishing. This adjustment is permitted by virtue of the fact that the delivering reel operates freely on its shaft, and the receiving reel is either frictionally or positively operated. When projecting pictures, the friction drive represented by the friction disk 64 permits of variation in the speed of the receiving reel on the shaft 55 relative the speed or rate of feed of the intermittent feeding mechanism, so that if the receiving reel attempts to run ahead of the intermittent feeding mechanism and thus tend to interfere with the proper framing of the picture, or tend to tear the perforations in the picture strip, the fact that the friction drive of the shaft is at this time functioning, will cause a slippage of the reel receiving the picture strip relative to the sheave 66, and thus prevent placing the picture strip under too great a strain. However, in rewinding, it is essential that the picture strip be wound quite snugly on the empty reel, and therefore the clutch block 78 is shifted in order that the shaft 55 will be positively driven, thus insuring that no slippage occur between the driving means and the reel. However, in some instances it is desirable to drive the re-winding reel frictionally, and this may be done by putting the clutch block in neutral position, as shown in Figure 4. The fact that the picture strip is merely feeding freely will prevent the imposition of great strain thereon. The friction braking means employed on the delivering reel insures that the picture strip will not be allowed to run out too fast.

Having thus described my invention and illustrated its use, what I claim as new and desire to secure by Letters Patent is:—

1. In a device of the character described, in combination, a pair of pulleys, a flexible belt connecting said pulleys, means for relatively displacing said pulleys with respect to lineal distance, and means including an immovable idler pulley for compensating said belt for maintaining the tension thereof substantially constant.

2. In a device of the character described, in combination, a driving element, an element to be driven, said elements being capable of lineal relative displacement, a belt operatively connecting said driving and driven elements, and means including a stationary idler between said elements for maintaining the tension of said belt constant when said elements are relatively lineally displaced.

3. A pair of reels, a driven shaft for one of said reels, a motor, a driving connection for said motor to said shaft, an intermittent feed mechanism, a connection between the latter and said shaft, and a disconnectible driving connection mounted on said shaft between the connection to said motor and the connection to said feed mechanism for controlling simultaneous operation of said shaft and one of said reels and intermittent feed mechanism.

4. A pair of reels, a driven shaft for one of said reels, a motor, a driving connection for said motor, to said shaft, an intermittent feed mechanism, a connection between the latter and said shaft, and a single clutch mechanism mounted on said shaft between said connections for controlling simultaneous or independent operation of both said feed mechanism and shaft.

5. Apparatus for winding and unwinding a strip including a driven winding reel and an unwinding reel free to rotate, means for feeding a strip from one to the other of said reels, means for driving said winding reel and said feeding means so constructed as to drive the winding reel either positively or by slipping connection and so interconnected that when the winding reel is driven by slipping connection the feeding means is positively driven and when the winding reel is positively driven the feeding means is free.

6. Apparatus for winding and unwinding a strip including a driven winding reel and an unwinding reel free to rotate, means for feeding a strip from one to the other of said reels, means for driving said winding reel and said feeding means including a clutch forming part of said means for driving said winding reel so constructed as to drive the winding reel either positively or by slipping connection and so interconnected that when the winding reel is driven by slipping connection the feeding means is positively driven and when the winding reel is positively driven the feeding means is free.

7. Apparatus for winding and unwinding a strip including a driven winding reel and an unwinding reel free to rotate, means for feeding a strip from one to the other of said reels, means for driving said winding reel and said feeding means including a clutch and friction member so constructed as to drive the winding reel either positively or by slipping connection and so interconnected that when the winding reel is driven by slipping connection the feeding means is positively driven and when the winding reel is positively driven the feeding means is free.

8. Apparatus for winding and unwinding a strip including a driven winding reel and an unwinding reel free to rotate, means for feeding a strip from one to the other of said reels, means for driving said winding reel and said feeding means so constructed as to drive the winding reel either positively or by slipping connection and so interconnected that when the winding reel is driven by slipping connection the feeding means is positively driven and said connection simultaneously compensates for change in speed of said winding reel and when the winding reel is positively driven the feeding means is free.

9. In a device of the character described, in combination, a pair of revoluble reels adapted to be simultaneously operated for feeding a strip from one to the other thereof, a feeding mechanism for said strip, a driving member, motion transmitting means for driving said feed mechanism coaxially arranged with said driving member, a driving connection between said driving member and motion transmitting means and a slip connection between said driving member and one of said reels adapted to compensate for the difference in speed of said reels in feeding and winding.

10. In a device of the character described, in combination, a pair of revoluble reels adapted to be simultaneously operated for feeding a strip from one to the other thereof, a feeding mechanism for said strip, a driving member connected to drive one of said reels, motion transmitting means for driving said feed mechanism coaxially arranged with said driving member, and means mechanically connected between said driving member and motion transmitting means and including a slip connection to the driving member adapted to compensate for the difference in speed of said reels in feeding and winding, and means for forming a positive connection between one of said revoluble reels and said driving member irrespective of said slip connection.

11. A pair of reels, a motor, an intermittent film strip feeding mechanism, a friction driving connection between the motor and one of said reels including a member driven by the motor, a positive driving connection between said driven member and intermittent feeding mechanism, a clutch arranged to move adjacent to said driven member and friction driving means for simultaneously controlling both of said connections and for rendering positive the friction connection.

12. In a device of the character described, in combination, a revoluble shaft, a reel mounted on and driven by said shaft, a pulley revoluble on said shaft, a friction drive between said pulley and shaft, an auxiliary pulley revoluble on said shaft, and a clutch between said pulleys for connecting either but not both of said pulleys positively to said shaft.

13. In a device of the character described, in combination, a revoluble shaft, a reel mounted on and driven by said shaft, and adapted to have a film strip wound thereon, a pulley revoluble on said shaft, a friction drive between said pulley and shaft, an auxiliary pulley revoluble on said shaft, feeding mechanism for said film strip, said mechanism being driven from said auxiliary pulley, and a clutch between said pulleys for connecting either but not both of said pulleys positively to said shaft.

LOUIS B. LARSEN.